(12) United States Patent
Kaaden et al.

(10) Patent No.: US 6,433,952 B1
(45) Date of Patent: Aug. 13, 2002

(54) METHOD FOR TRACKING CONTROL

(75) Inventors: Jürgen Kaaden, Villingen-Schwenningen; Peter Mahr, Weiler, both of (DE)

(73) Assignee: Thomson Licensing, S.A., Boulogne-Billancourt (FR)

(*) Notice: Subject to any disclaimer, the term of this patent is extended or adjusted under 35 U.S.C. 154(b) by 0 days.

(21) Appl. No.: 09/400,233

(22) Filed: Sep. 21, 1999

(30) Foreign Application Priority Data

Oct. 10, 1998 (DE) .......................... 198 46 835

(51) Int. Cl.$^7$ .............................................. G11B 5/596
(52) U.S. Cl. ..................................................... 360/77.12
(58) Field of Search ........................... 360/77.12, 74.6, 360/77.03, 74.4, 78.05, 48; 369/50

(56) References Cited

U.S. PATENT DOCUMENTS

| | | | |
|---|---|---|---|
| 3,919,697 A | * 11/1975 | Walker ................ | 360/77.12 X |
| 4,472,750 A | 9/1984 | Klumpp et al. | |
| 4,802,030 A | * 1/1989 | Henry et al. ................ | 360/60 |
| 5,294,791 A | * 3/1994 | Pahr ..................... | 360/77.12 X |
| 5,629,813 A | 5/1997 | Baca et al. | |
| 5,661,616 A | 8/1997 | Tran et al. | |
| 5,726,824 A | * 3/1998 | Ayres et al. ............. | 360/77.12 |
| 5,917,671 A | 6/1999 | Kaaden et al. | |
| 5,943,180 A | * 8/1999 | Seo et al. ................ | 360/77.12 |

FOREIGN PATENT DOCUMENTS

| | | |
|---|---|---|
| DE | 69017725 | 10/1995 |
| DE | 69110702 | 2/1996 |
| EP | 0562563 | 8/1994 |
| EP | 0795864 | 9/1997 |
| WO | 9412975 | 6/1994 |

OTHER PUBLICATIONS

Patent Abstracts of Japan, vol. 000, No. 000, 1993, & JP 05046961 A (Sharp Corp), Feb. 26, 1993.
Search Report for German Appln. No. 19846835.0.

\* cited by examiner

*Primary Examiner*—David Hudspeth
*Assistant Examiner*—K. Wong
(74) *Attorney, Agent, or Firm*—Joseph S. Tripoli; Joseph J. Laks; Daniel E. Sragow

(57) ABSTRACT

A method for tracking control of a head unit with respect to data tracks on a magnetic tape determines a first tracking signal and a second tracking signal from control tracks recorded on the tape. The data tracks are divided into successive data sections, each of which is subdivided into an initial region and a useful region. A first control track extends over the entire length of the data section. In addition to this, a second control track is provided in the initial region of each data section. A first tracking signal is generated from the first control track and a second tracking signal is generated from the first and second control track. A difference signal is generated and stored, which is based on a comparison of the first and second tracking signal. A tracking control signal applied to an actuator adjusting the head unit is generated from the second tracking signal when the second tracking signal is available. The tracking control signal is generated from the first tracking signal and the difference signal when the second tracking signal is not available.

6 Claims, 3 Drawing Sheets

METHOD FOR TRACKING CONTROL

FIELD OF THE INVENTION

The invention relates to a method for tracking control, in particular for a magnetic tape recorder. The invention is based on a method according to the precharacterizing clause of Claim 1.

In the following text, the term magnetic tape recorder means any apparatus in which signals, data or information are recorded in analogue and/or digital form on a magnetic tape and/or are read from such a magnetic tape. Irrespective of this, such apparatus may also have other functions, for example they may be combined with an electronic camera.

BACKGROUND OF THE INVENTION

The publication "Towards the Multitrack Digital Video Tape Recorder" by Francois Maurice in "The Magnetic Society of Japan" 1991, Volume 15, pages 389 to 394 discloses a magnetic tape recorder in which a large number of data and/or signal tracks are recorded on a magnetic tape using the method of longitudinal track recording. In the case of the apparatus disclosed in this document, the data tracks are written simultaneously by means of a matrix head. In one exemplary embodiment of this apparatus, up to 80 parallel tracks are written with a width of 7 $\mu$m without guard bands, that is to say without any intermediate space between the individual tracks.

The data tracks are read by a magneto-optical scanning device, which has a magneto-optical transducer. Using the Kerr effect, the alternating magnetization on the data tracks is converted into optical signals from which, in turn, electrical signals are produced by means of a photo-sensitive CCD element ("Charge Coupled Device"). In this case, each data track is assigned a cell or a pixel of the CCD element. In order to replay the stored data correctly, it is advantageous if each data track is imaged onto one, and only one, associated CCD pixel, to be precise even if, for example, the height of the magnetic tape is fluctuating or if mechanical vibration is varying the position of the data tracks with respect to the magneto-optical transducer. In order to achieve this aim, it is known from the prior art for a transparent plane-parallel tracking plate to be provided in the beam path between the magneto-optical transducer and the CCD element. The tracking plate is movable which means that one, and only one, data track is imaged onto each CCD pixel, as is disclosed, for example, in German Patent Application 197 47 493.4, from the same applicant.

In the case of a "Stationary Digital Cassette Recorder" magnetic tape system which is referred to by the abbreviation SDCR, 80 data tracks are recorded simultaneously, of which three are so-called servo tracks in which suitable patterns are stored in order to make it possible to detect a laterally offset map of the optical signals emitted from the magneto-optical transducer, on the CCD element. Suitable patterns and a method for evaluation of these patterns are described in German Patent Application DE-A 196 10 089 from the same applicant. However, these are not the subject of the present application.

The known method and the known appliance are able to compensate very quickly for fluctuations in the tape height and mechanical vibration. However, in practice, it has been found that the optics which are used are not always able to image all 80 data tracks completely homogeneously. This means that, for example, the first data tracks on one edge of the magnetic tape are imaged precisely onto one pixel, while a significant error occurs between the last data tracks on the other edge of the magnetic tape and their associated pixels.

SUMMARY OF THE INVENTION

Based on this, the object of the invention is to specify a method for tracking control, which allows tracking correction which preserves the advantages of the known method but avoids its disadvantages.

This object is achieved by a method according to Claim 1. The method is characterized in that while a data section is moving past the head unit, primary measured values are determined from at least one control track. Furthermore, while the initial region of a data section is moving past the head unit, secondary measured values are determined from at least one additional control track. A tracking signal is derived from the primary and secondary measured values, which indicates whether and, if appropriate, in which direction the head unit of the magnetic tape recorder has moved away from its nominal position on the data medium. The tracking signal is used to produce a tracking control signal, by means of which suitable corrections are made in order to compensate for errors in tracking.

It is particularly advantageous if for the purpose of corrections the tracking control signal is emitted to at least one actuator, by means of which the position of the regions which can be addressed by the head unit on the data medium is varied. This can be done, for example, by a tracking plate which influences the beam path of the light coming from the magneto-optical transducer, in such a way that one, and only one data track recorded on the data medium is in each case imaged onto each pixel of the CCD element.

According to a development of the invention, it is possible first of all to determine a first tracking signal from the primary measured values while the initial region of the data section is moving passed the head unit and then to determine a second tracking signal in both the primary measured values and the secondary measured values, after which a difference value is formed from the first tracking signal and the second tracking signal and is stored and, during this time interval, the tracking control signal is produced solely from the second tracking signal.

Building on this, it is advantageous if while the useful region of a data section is moving past the head unit a first tracking control signal is determined from the primary measured values, and if during this time interval the tracking control signal is produced from the first tracking signal as well as the stored difference value. This has the advantage that, although only one control track is evaluated, account is taken as far as possible of shortcomings in the optical imaging system along the width of the data medium for tracking control of the head unit.

A second aspect of the invention relates to a method for recording data on a data medium in the form of tape, in particular in the form of longitudinal tracks.

DE 196 10 089 discloses the use of servo tracks for longitudinal track recording over the entire length of a magnetic tape. As explained initially, it is advantageous for tracking that it is as accurate as possible for a plurality of servo tracks to be recorded distributed over the entire width of the magnetic tape. However, a disadvantage in this case is that space on the magnetic tape is filled with servo data, which, in consequence, is no longer available for recording useful data.

Based on this, a further object of the invention is to specify a recording method which allows an increased useful data density of a magnetic tape, without this adversely affecting the quality of tracking.

This object is achieved by a method according to Claim 5. Based on the recording method according to the invention, servo tracks are recorded early in those regions where the tracking method actually carries out evaluation. This has the advantage that as much space as possible on the data needed is available for useful data.

Further advantageous developments of the recording method according to the invention are the subject matter of dependent claims.

A final aspect of the invention is to provide a magnetic tape which allows the use of the method according to the invention for tracking. This object is achieved by a magnetic tape according to Claim 10.

This magnetic tape is distinguished by a particularly high storage capacity for freely usable data.

BRIEF DESCRIPTION OF THE DRAWINGS

The drawing shows, schematically, a magnetic tape recorder in which the method according to the invention and the magnetic tape according to the invention are used. In the figures.

FIG. 1b shows a detail from the magnetic tape in FIG. 1a, and

DETAILED DESCRIPTION OF PREFERED EMBODIMENTS

Figure 1A:
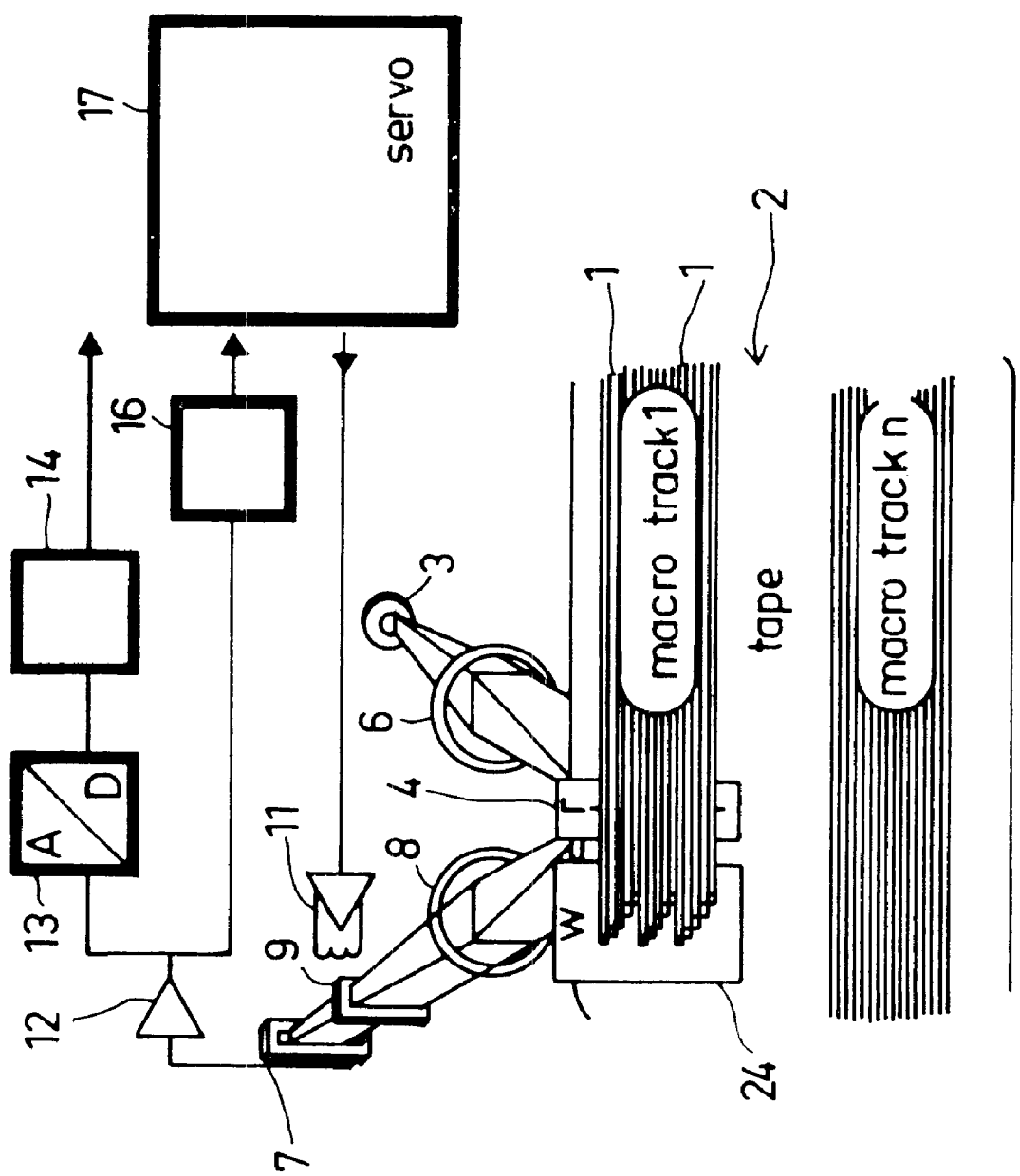
FIG. 1a shows a schematic illustration of a magnetic tape recorder in which a plurality of parallel data tracks are recorded at the same time.

FIG. 1a shows, schematically, the design of a magnetic tape recorder which records a plurality of parallel data tracks 1 on a magnetic tape 2, and reads these tracks from said tape. A laser diode 3 forms a divergent light source for linear-polarized light. The diverging light beams are imaged on a magneto-optical transducer 4 by means of optical imaging means, as a focused bar. The optical imaging means are shown schematically in FIG. 1 as a lighting lens 6. The incident light is reflected in the magneto-optical transducer 4 and is imaged on the light-sensitive region of a CCD element 7. The imaging means are shown schematically in the figure, as the imaging lens 8. When the incident light is reflected in the magneto-optical transducer 4, stray magnetic fields caused by the magnetization of the adjacent magnetic tape 2 cause the polarization plane of the reflected light to rotate with respect to the polarization plane of the incident light. This effect is called the Kerr effect. Before the light strikes the CCD element 7, it passes through an analyser which is not shown in the figure but which is set such that light whose polarization plane has not been rotated passes through without being attenuated. The described parts form a read unit, which is adjusted such that the light which is influenced by in each case one data track is imaged on a pixel of the CCD element 7. In order to ensure this, a tracking plate 9 is arranged in the beam path of the reflected light. The tracking plate 9 consists of a plane-parallel transparent plate, which can be moved or pivoted backwards and forwards by actuating means 11. The refractive index of the plate 9 is greater than that of air, so that the emerging light is offset parallel with respect to the entering light. The light which strikes the CCD element 7 can thus be moved in the vertical direction in the figure by moving the tracking plate 9. This means that the position of the regions which are read by the CCD element on the magnetic tape 2 are shifted, so that optimum adjustment can be achieved.

The arrangement described so far is used to produce an electrical output signal from the CCD element 7 from the alternating magnetization of each data track 1 on the magnetic tape 2. These signals are converted by suitable circuit means, which comprise an amplifier 12, an analogue/digital converter 13 as well as a signal processing unit 14, into a digital, electrical output signal which is available, for example, for replaying music. Furthermore, the output signal from the amplifier 12 is emitted to a preprocessing stage 16, which evaluates the signals from the servo tracks. The output signal from the preprocessing stage 16 is a tracking signal which indicates whether and, if appropriate, in which direction, those pixels in the CCD element 7 which are associated with the servo tracks are offset from the optical images of the servo tracks on the CCD element. The tracking signal is supplied to a servo controller 17 which emits a tracking control signal to the actuating means 11, which varies the position of the tracking plate 9 so that each data track is once again accurately imaged on one pixel of the CCD element 7.

Figure 1B:
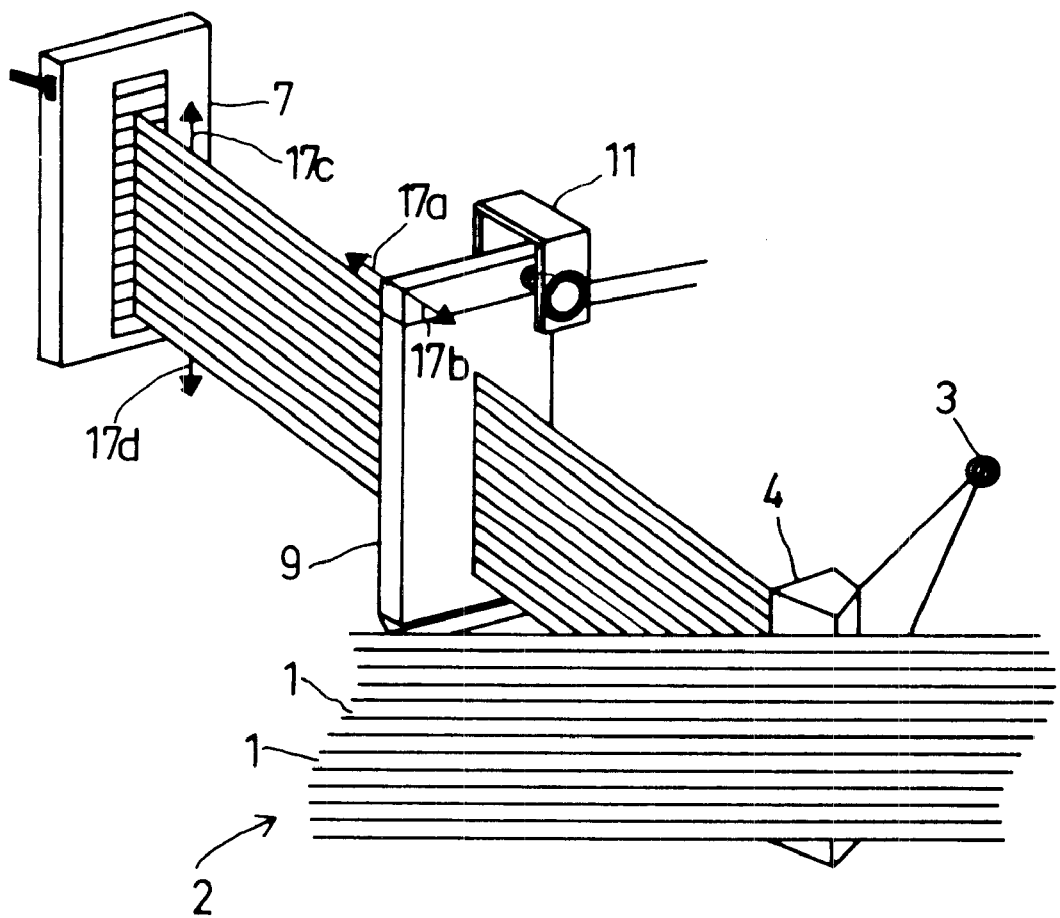

The arrangement of the tracking plate 9 is shown once again in greater detail in FIG. 1b, in which case, for clarity, all the other optical imaging means have been omitted. The way in which the tracking plate 9 operates is disclosed in detail in the European Patent Application with the file reference 97 402 267.5 from the same applicant. In the figure, the arrows 17a, 17b show the movement of the tracking plate 9. The arrows 17c, 17d indicate the influence this has on the imaging of the data tracks on the CCD element.

Figure 2:
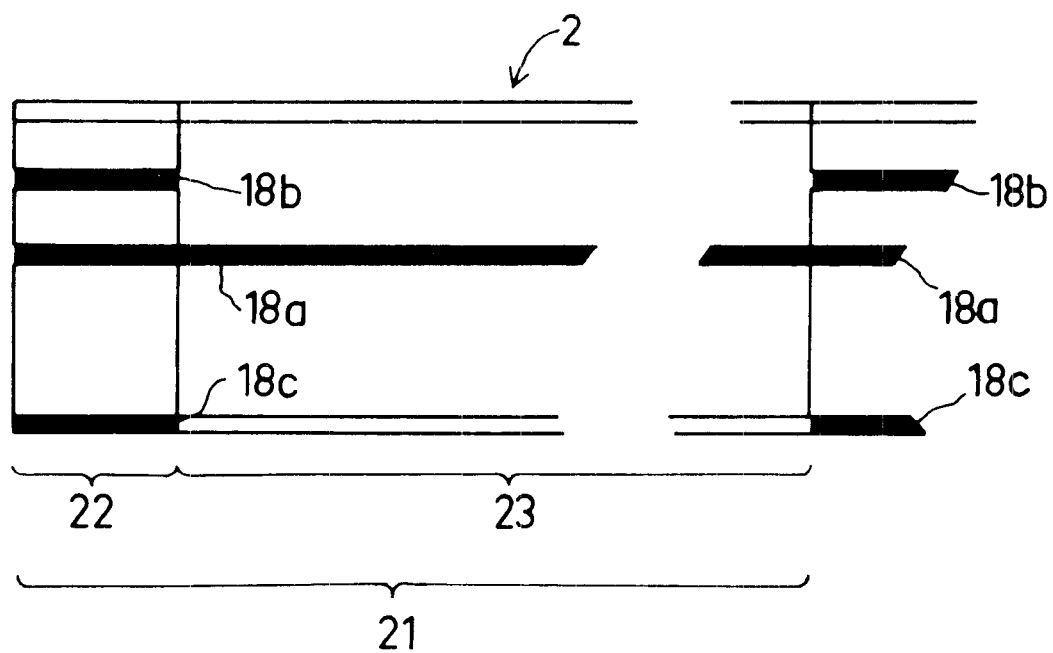
FIG. 2 shows an illustration of the arrangement for tracking control.

FIG. 2 shows a detail of the magnetic tape 2, in which servo tracks 18a . . . 18c are emphasized by shaded areas. Each servo track comprises, for example, three data tracks. All the other data tracks are arranged parallel to these servo tracks 18a . . . 18c, but are not shown for the sake of clarity. In the case of the magnetic tape recorder being described, the data tracks are recorded in longitudinal tracks, which are split into individual data sections in the longitudinal direction. FIG. 2 shows a data section 21 which is divided into an initial region 22 and a useful region 23. As can be seen, a first servo track 18a extends over the entire length of the data section 21 while, in contrast, two further servo tracks 18b, 18c extend only over the initial region 22.

The way in which the method according to the invention for tracking control operates will now be explained in more detail with reference to FIG. 2.

While the initial region 22 of the data section 21 is moving past the magneto-optical transducer 4, all three servo track arrangements 18a . . . 18c are evaluated by means of the preprocessing stage 16 and the servo controller 17, and the tracking control plate 9 is moved as necessary, in order to improve the tracking. The evaluation of the three servo tracks 18a . . . 18c leads to good tracking for all data tracks, but consumes a relatively large amount of space on the data medium, and evaluation capacity. Furthermore, the evaluation of all the servo tracks slows down tracking control. However, this is irrelevant in the initial region 22 of the data section 21 since the data stored there are intended only for synchronization of the evaluation electronics.

In detail, in the initial region 22, one tracking signal is, on the one hand, determined solely from the servo track 18a and, on the other hand, a further tracking signal is determined from all three servo tracks 18a . . . 18c. Owing to the inhomogeneities in the optical imaging of the data tracks on the light-sensitive region of the CCD element 7, the two tracking signals differ. This difference is stored as a difference value, and provides a measure of such inhomogeneities.

The situation in the useful region 23 of the data section 21 is different since, here, as much of the space on the magnetic tape 2 as possible is intended to be available for useful data, while tracking control is intended to work as quickly as possible at the same time. For this reason, only the servo track 18a continues into the useful region 23. Fast and nevertheless accurate tracking control in the useful region 23 is achieved over the entire tape height with the method according to the invention in that a correction value is taken into account, in addition to the measured values from the servo track 18a.

The amount by which the tracking signal produced from the servo track 18a differs from the tracking signal which takes account of all three servo tracks 18a . . . 18c is known from the initial region 22. This error is stored as the difference value described above. On the assumption that the useful region 23 is subject to the same inhomogeneities as the initial region 22, it is possible to evaluate only one servo track instead of three, and to add the said difference value to the result. In practice, it has been found that fast and accurate tracking can actually be achieved in this way.

The advantage of this method is that space is saved on the magnetic tape 2, while at the same time allowing the tracking control to respond faster, in particular to external, mechanical disturbances.

The recording method according to the invention takes account of the requirements of the tracking control method described above. A plurality of parallel data tracks are recorded on the magnetic tape 2 using the longitudinal track method, by a matrix head 24 (FIG. 1a). The data tracks are split, as described in conjunction with FIG. 2, into regions, in which case three servo tracks are recorded in the initial region 22 while, in contrast, only one servo track 18a is recorded in the useful region 23. In comparison to a method in which three servo tracks are recorded continuously, it is possible using the recording method according to the invention to achieve an increased data density for the useful data.

The method according to the invention for tracking control may also be used for recording data on the data medium, and not only for the playing.

What is claimed is:

1. Method for tracking control of a head unit with respect to data tracks on a data medium, which data tracks are arranged essentially parallel to the movement direction of the data medium relative to the head unit, wherein the data tracks are divided into successive data sections, which are each subdivided into an initial region and a useful region, wherein the method comprises the following steps:
    a) determining primary measured values from a first control track extending within the initial region and the useful region while a data section is moving past the head unit;
    b) determining secondary measured values from a second control track extending within the initial region while the initial region of a data section is moving past the head unit;
    c) determining a first tracking signal from the primary measured values;
    d) determining a second tracking signal from both the primary measured values and the secondary measured values,
    e) generating a difference signal based on the comparison of the first and the second tracking signal;
    f) storing the difference signal;
    g) generating a tracking control signal from the second tracking signal while the initial region is moving past the head unit; and
    h) generating a tracking control signal from the first tracking signal and the stored difference signal while the data region is moving past the head unit.

2. Method according to claim 1, in which the tracking control signal is outputted to an actuator by means of which the position of the regions, which can be addressed by the head unit on the data medium, is adjustable.

3. Method for recording data by a head unit on a data medium in the form of tape, in which case the method comprises the following steps:
    a) recording a plurality of data tracks on the data medium at the same time, wherein the data tracks are divided into successive data sections, each of which are subdivided into an initial region and a useful region,
    b) recording a primary control track extending within the data section for tracking control of the head unit, and
    c) recording a secondary control track extending only within the initial region of each data section.

4. Magnetic tape having a plurality of longitudinal data tracks which are arranged essentially parallel to one another and are divided into data sections, each of which subdivided into an initial region and a useful region, wherein a primary control track extends within the data section, characterized in that a secondary control track is provided extending only within the respective initial region of each data section.

5. Magnetic tape according to claim 4, wherein the primary control track is located essentially centrally on the data medium.

6. Magnetic tape according to claim 4, wherein the secondary control track is located in the vicinity of an edge of the data medium within the initial region of each data section.

* * * * *